Nov. 16, 1948.  R. A. CAMPBELL  2,453,698
REVOLVING POLARIZED DISK

Filed Dec. 28, 1945  3 Sheets-Sheet 1

INVENTOR.
ROBERT A. CAMPBELL
BY *Victor J. Evans & Co.*
ATTORNEYS

Nov. 16, 1948.  R. A. CAMPBELL  2,453,698
REVOLVING POLARIZED DISK
Filed Dec. 28, 1945  3 Sheets-Sheet 2

INVENTOR.
ROBERT A. CAMPBELL

BY Victor J. Evans & Co.

ATTORNEYS

Nov. 16, 1948.   R. A. CAMPBELL   2,453,698
REVOLVING POLARIZED DISK
Filed Dec. 28, 1945   3 Sheets-Sheet 3
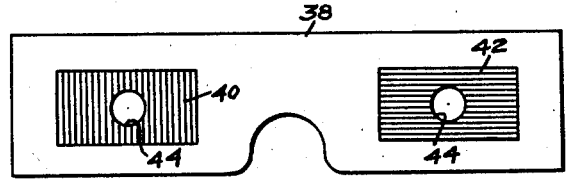
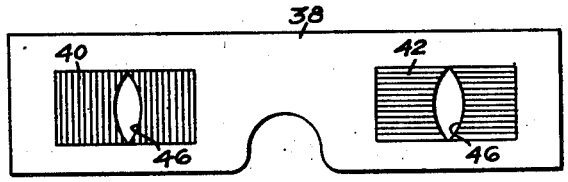
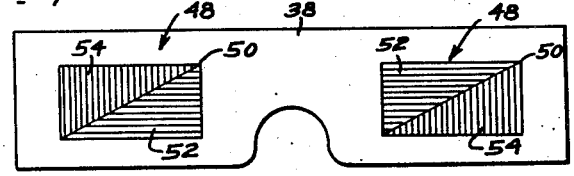
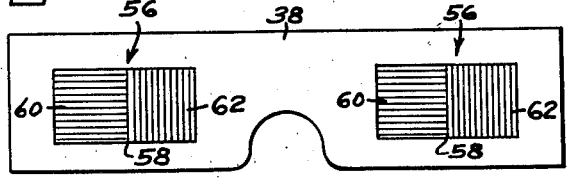
INVENTOR.
ROBERT A. CAMPBELL
BY Victor J. Evans & Co.
ATTORNEYS Patented Nov. 16, 1948

2,453,698

UNITED STATES PATENT OFFICE 2,453,698

REVOLVING POLARIZED DISK

Robert A. Campbell, Oak Park, Ill.

Application December 28, 1945, Serial No. 637,536

2 Claims. (Cl. 88—16.6)

This invention relates to a revolving polarized disc and more particularly to a means of producing an optical illusion simulating that of depth by dividing light rays from the projector into two planes with the use of polarized transparent material.

The two planes of light referred to being the vertical plane and the horizontal plane.

The light projecting from the motion picture projector is divided into one of the two planes every sixteenth of a second by a revolving disc of light polarizing material, which is placed in front of the projector lenses.

The invention contemplates the use of the usual motion picture film or other image taken from a single point of observation. The effect produced is entirely illusory and is not the effect of stereoscopy.

The invention comprises the apparatus hereinafter more fully described, claimed and illustrated in the accompanying drawings in which:

Figure 4 is a perspective view of the viewer used in conjunction with the device and Figures 5, 6, 7 and 8 are modifications thereof.

Figures 1, 2:
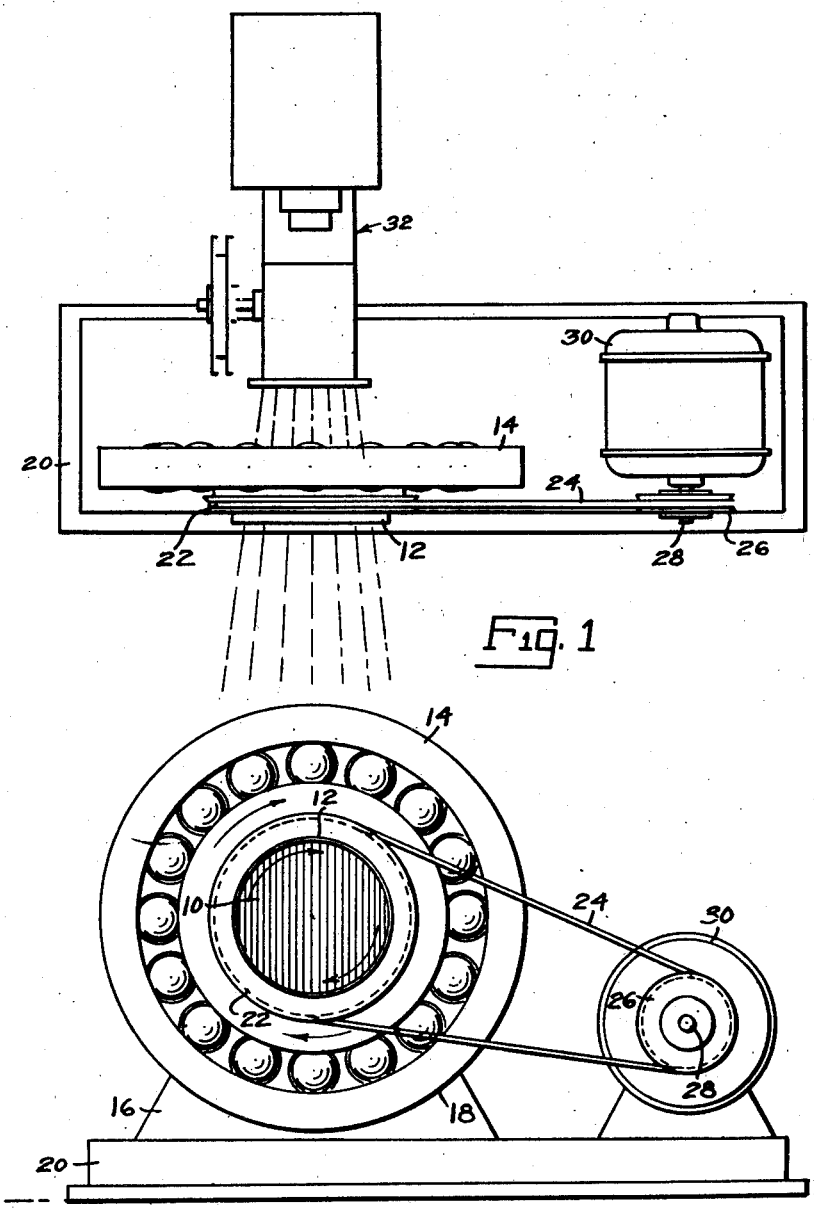
Figure 1 is a plan view of an embodiment of the invention.
Figure 2 is an elevational view thereof.
Figure 3:
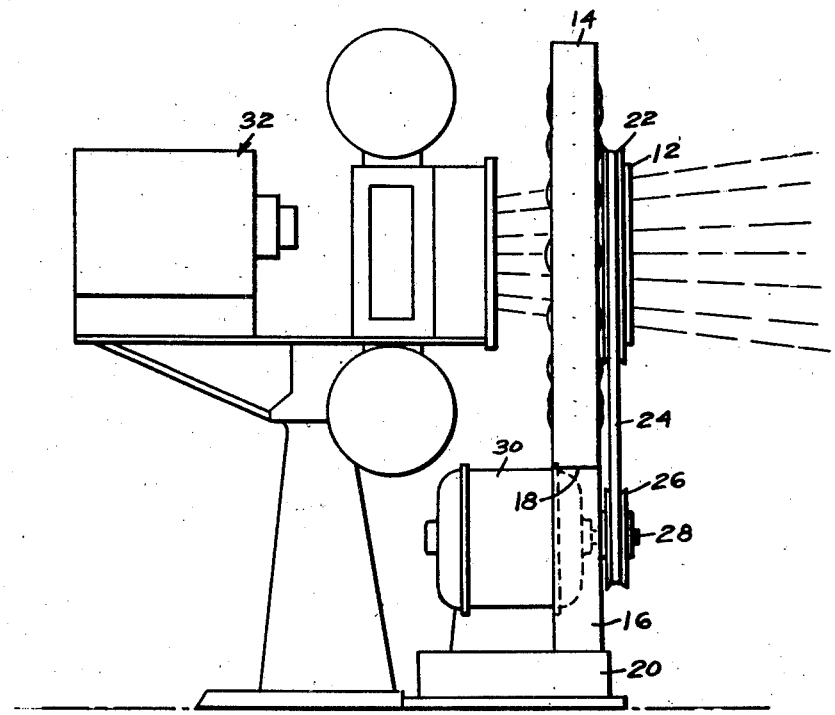
Figure 3 is a side view thereof.

Referring more in detail to the drawing the reference numeral 10 designates a light-polarizing disc which is inserted in the center of a cylinder 12 which is rotatably mounted in a ball bearing race 14 mounted in the support 16, having the curved seat 18 to conform to the race and secured to a rectangular base 20. The light-polarizing disc 10 may be of any well known construction such as a Nicol's prism or one of the light-polarizing materials sold under the trade name "Polaroid." The cylinder 12 is rotated by means of a pulley 22 mounted thereon over which is trained the belt 24 having driving connection with a pulley 26, mounted on the shaft 28 of the motor 30, mounted on the base 20 in spaced relation to the ball bearing race 14. Light from the projector of a motion picture camera 32 positioned in the rear of the base 14 is directed through the disc 10 as it is revolved by the motor 30, thus making the projected light polarized to the plane of polarization of the disc as the disc revolves it polarizes the light in a vertical plane to the horizontal then back to the vertical.

The image projected on the screen by the projector is then observed by means of a viewer or analyzer 34 shaped similar to a pair of glasses having the templets 36 and bridge 38. The lenses of the viewer are a vertically polarized lens 40 for one eye and a horizontally polarized lens 42 for the other eye.

As the disc revolves the light will enter each eye separately when on the vertical or horizontal plane. Between the vertical and the horizontal planes the light will reach both eyes, this factor is important as it gives the eyes a rest and prevents flicker, thus making the picture or image clearer to the observer. The disc is revolved at the rate of approximately eight times a second by the motor, the speed of which is preferably synchronized with the projector.

Instead of a revolving disc a reciprocating strip having polarized vertical and horizontal lenses therein may be reciprocated in front of the projector by a motor, each lens remaining in the plane of the directed light for approximately a sixteenth of a second.

As the light-polarizing disc revolves it breaks the projected light into two planes. Thus the observer using the viewer will receive the horizontal beams in one eye but the vertical lenses would be blacked out and vice versa, thus an assortment of light values enter the individual eyes of the observer and the illusion simulating depth is gained.

Figure 4:
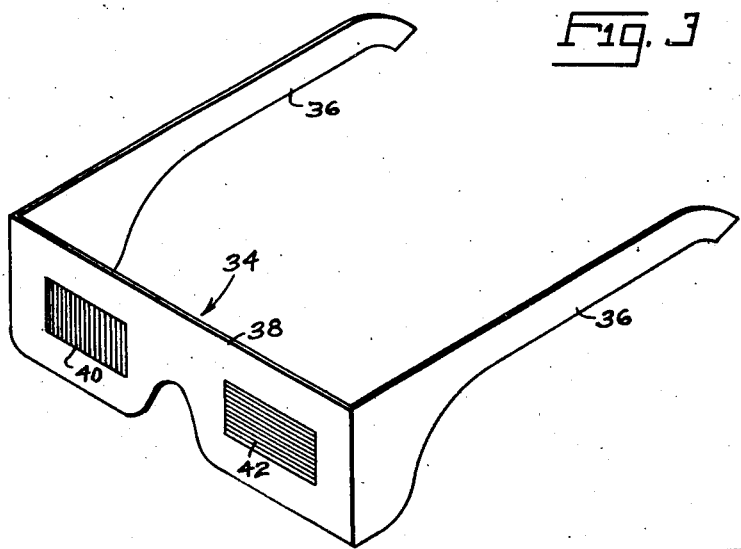

In Figure 5 the lenses are exactly as previously described for Figure 4, except that a circular shaped aperture 44 is provided at the center of each lens. Thus both eyes will see the object at the same time by means of the apertures. But one eye will use the full lens while the eye in the blacked out lenses will view the object through the aperture. This will cause a distortion which will also result in an illusion simulating depth. The disc may be rotated slow or fast but the same illusion will result. But in the event one eye becomes fatigued from the light entering the aperture the disc can make it possible to automatically change from one eye to the other, the effect produced by the aperture.

Figure 6 is similar to Figure 5 except that the circular shaped aperture has been changed to a vertical elliptically shaped aperture 46. The effect on the eyes of the observer are the same as previously described for Figure 4. Thus the same eye may use the slot for a number of frames without having the aperture changed to the other eye and the disc may revolve at any speed.

In Figure 7 the lenses 48 are diagonally divided at 50 into a horizontal plane portion 52 and a vertical plane portion 54, thus each eye will see a different portion of the same frame, as the disk revolves the different portions are exchanged with each succeeding frame, thus the left eye may receive the upper vertical plane of light while the right eye will see the lower vertical plane of light, and vice versa for the horizontal plane of light, thus an illusion simulating depth results.

Figure 8 is the same as Figure 7 except that the lenses 56 are bisected by the vertical line 58 to form equal horizontal plane portions 60 and equal vertical plane portions 62, in this case the disc can also be revolved at any speed.

It is to be understood that the observer sees only the planes of light peculiar to the individual lens but that due to the speed of the disc an optical illusion is caused, the images being received by each eye changing so rapidly that an effect simulating that of a third dimensional image will result.

It is believed the operation and the results obtained by such operation will be apparent to those skilled in the art and it is to be understood that changes in the method and apparatus may be made providing such changes fall within the spirit of the invention and the scope of the appended claims.

Having thus described the invention what is claimed as new and desired to be secured by Letters Patent is:

1. In an apparatus for observing an object, the combination of a support adapted to be placed in front of the object, a cylindrical sleeve, a ball bearing means encompassing said sleeve, said support receiving said ball bearing means whereby said sleeve is rotatably mounted in said support in front of the object for rotation, a disc of light-polarizing material in said sleeve and secured to the internal walls thereof, said light-polarizing material being adapted to polarize light therethrough in parallel planes extending parallel to the axis of rotation of said sleeve, means drivingly connected to said sleeve for continuously rotating the same whereby rotation of said light-polarizing disc causes the planes of polarized light to revolve on and about the axis of said sleeve, and a viewer adapted to be worn by an observer for receiving the polarized light from said disc, said viewer having a pair of spaced lenses of light-polarizing material, the light-polarizing planes of said lenses, respectively, being mutually perpendicular to each other, whereby light through said disc will pass through a lens when the plane of polarization of said rotating disc is in alignment with the polarizing plane of the respective lens thereby causing the visibility through one lens to be progressively increased and in the other lens to be correspondingly progressively decreased.

2. The combination of claim 1, wherein the lenses are provided at substantially the center thereof with apertures.

ROBERT A. CAMPBELL.

REFERENCES CITED

The following references are of record in the file of this patent:

UNITED STATES PATENTS

| Number | Name | Date |
|---|---|---|
| 1,714,849 | Duponte | May 28, 1929 |
| 1,879,793 | Chubb | Sept. 27, 1932 |
| 2,218,875 | Parsell | Oct. 22, 1940 |
| 2,309,879 | Willis | Feb. 2, 1943 |
| 2,323,518 | Cochran | July 6, 1943 |
| 2,334,446 | Serrell | Nov. 16, 1943 |

FOREIGN PATENTS

| Number | Country | Date |
|---|---|---|
| 552,582 | Great Britain | Apr. 15, 1943 |
| 555,670 | Great Britain | Sept. 2, 1943 |